United States Patent [19]
Zoeller

[11] Patent Number: 5,361,239
[45] Date of Patent: Nov. 1, 1994

[54] COMPENSATION METHOD USING A SINGLE TRANSMITTER MEASUREMENT TOOL

[75] Inventor: William A. Zoeller, Portland, Conn.

[73] Assignee: Baker Hughes Incorporated, Houston, Tex.

[21] Appl. No.: 551,636

[22] Filed: Oct. 25, 1990

Related U.S. Application Data

[63] Continuation of Ser. No. 426,581, Oct. 25, 1989, abandoned.

[51] Int. Cl.$^5$ .......................... G01V 1/40; G01V 3/30
[52] U.S. Cl. ........................................ 367/30; 367/48; 367/57; 364/422; 324/338; 324/357
[58] Field of Search ...... 367/30, 35, 48, 57, 364/422, 324/338, 357

[56] References Cited

U.S. PATENT DOCUMENTS

| | | | |
|---|---|---|---|
| 3,208,548 | 9/1965 | Levin et al. | 367/30 |
| 3,270,316 | 8/1966 | Walker et al. | 367/30 |
| 3,292,143 | 12/1966 | Russell | 367/33 |
| 3,524,162 | 8/1970 | Zill | 367/33 |
| 4,278,941 | 7/1981 | Freedman | 324/338 |
| 4,346,460 | 8/1982 | Schuster | 367/27 |
| 4,626,785 | 12/1986 | Hagiwara | 324/339 |
| 4,678,997 | 7/1987 | Jones | 324/341 |
| 4,748,415 | 5/1988 | Vail | 324/346 |
| 4,785,247 | 11/1988 | Meador et al. | 324/338 |
| 4,899,112 | 2/1990 | Clark et al. | 324/338 |

FOREIGN PATENT DOCUMENTS 1245286 11/1988 Canada .
0121359 10/1984 European Pat. Off. .

OTHER PUBLICATIONS

Fredericks et al; "Formation Evaluation While . . . Tool"; 64th Annu SPE Tech Conf, pp. 521-536, Oct. 11, 1989, SPE-19622.

Clark et al; "Electromagnetic Propagation . . . Experiment"; 63rd Annu. SPE Tech. Conf., pp. 103-117, Oct. 5, 1988, SPE-18117.

B. Clark, M. Luling, J. Jundt, M. Ross and D. Best "A Duel Depth Resistivity Measurement for FEWD", SPWLA 29th Annual Logging Symposium, Jun. 1988—directed to a dual depth resistivity measurement tool for formation evaluation while drilling.

M. M. Wisler, "Real-Time Electromagnetic Propagation Resistivity and Memory for MWD", 11th European Formation Evaluation Symposium, Sep. 1988.—directed to a measurement while drilling tool.

*Primary Examiner*—Nelson Moskowitz
*Attorney, Agent, or Firm*—Fishman, Dionne & Cantor

[57] ABSTRACT

A method for borehole compensation using a single transmitter measurement electromagnetic propagation tool is disclosed. Phase shift and attenuation are measured at each of three positions relative to a measurement depth. The measurements are used to calculate borehole compensation. The method may be used for other single transmitter tools and provides more accurate formation measurement in boreholes having high rugosity and washouts.

21 Claims, 1 Drawing Sheet

COMPENSATION METHOD USING A SINGLE TRANSMITTER MEASUREMENT TOOL

The present application is a continuation of U.S. Application Ser. No. 426,581, filed Oct. 25, 1989, now abandoned.

TECHNICAL FIELD

This invention relates to the field of sensing borehole parameters, particularly parameters of interest during the drilling of oil well boreholes. More particularly, the invention relates to a method for borehole compensation.

BACKGROUND OF THE INVENTION

Tools for evaluating the physical characteristics of rock formations surrounding a borehole are known. As a measuring tool positioned in a well borehole passes through various rock layers of the surrounding formation, hole rugosity and hole washouts effect the tool measurements and are potentially a source of measurement error. Misinterpretation of the rock formation characteristics can greatly complicate the formation evaluation of that rock.

There is a constant and intensive effort in the art to develop new tools and methods for borehole compensation to provide more accurate formation measurements during drilling.

SUMMARY OF THE INVENTION

Method for borehole compensation at a measuring depth in a formation surrounding the borehole using a single transmitter measurement tool is disclosed. The tool includes a cylindrical housing, a transmitter for generating electromagnetic waves and first and second receivers each responsive to the electromagnetic waves. The transmitter is secured within the housing, the first receiver is secured within the housing at an axial distance $d_1$ from the transmitter and the second receiver is secured within the housing at an axial $d_2$ from the transmitter, wherein $d_2$ is greater than $d_1$.

The tool is placed in a first vertical depth position within the borehole so that the measuring depth is between the first and second receivers. A first electromagnetic wave is propagated through the formation. The first wave is sensed with the first receiver and a signal indicative of the phase shift $P_{a1}$, of the first wave between the transmitter and the first receiver, and an amplitude $A_{a1}$ of the first wave at the first receiver is generated. $P_{a1}$ and $A_{a1}$ are recorded. The first wave is sensed at the second receiver. A signal indicative of the phase shift, $P_{a2}$, of the first wave between the transmitter and the second receiver and the amplitude, $A_{a2}$, of the first wave at the second receiver is generated. $P_{a2}$ and $A_{a2}$ are recorded.

The tool is placed in the second vertical depth position within the borehole wherein the transmitter is axially displaced by the distance $d_1$ relative to the first position and the measuring depth is between the transmitter and the first receiver. A second electromagnetic wave is propagated through the formation. The second wave is sensed with the second receiver. A signal indicative of the phase shift, $P_{b2}$ of the second wave between the transmitter and the second receiver, is generated. $P_{b2}$ is recorded. A signal indicative of the amplitude, $A_{b2}$ of the second wave at the second receiver is generated. $A_{b2}$ is recorded.

The tool is placed in a third vertical depth position within the borehole so that the transmitter is axially displaced by the distance $d_2$ relative to the first position and the measuring depth is above the transmitter. A third electromagnetic wave is propagated through the formation. The third wave is sensed with the first receiver. A signal indicative of the amplitude, $A_{c1}$, of third wave at the first receiver is generated. $A_{c1}$ is recorded. A signal indicative of the phase shift, $P_{c1}$, of the third wave between the transmitter and the first receiver is generated. $P_{c1}$ is recorded.

A borehole compensated phase shift, BCPS, is calculated, where:

$$BCPS = ((P_{a2} - P_{a1}) + (P_{b2} - P_{c1}))/2.$$

A borehole compensated attenuation, BCAT, is calculated, where:

$$BCAT = 20 \log (A_{a2}/A_{a1})/2 + 20 \log (A_{b2}/A_{c1})/2$$

BRIEF DESCRIPTION OF THE DRAWINGS

FIG. 2b shows a comparison between the signals received by the tool shown in FIG. 2a.

DETAILED DESCRIPTION OF THE INVENTION

Figure 1:
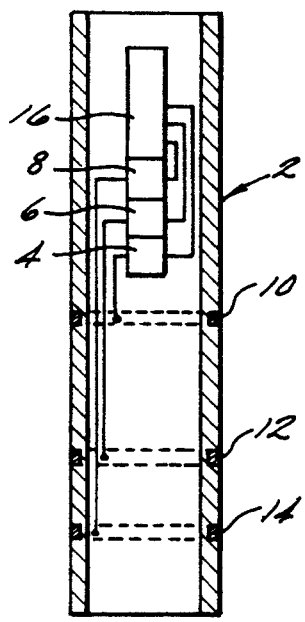
FIG. 1 shows a schematic cross sectional view of a single transmitter formation measurement tool.

FIG. 1 shows a schematic view of a single transmitter formation measurement tool. The tool includes a cylindrical housing 2, a transmitter 4 for generating a waveform, a first receiver 6 and second receiver 8, each receiver being responsive to the waveform generated by the transmitter. The transmitter 4 is secured within the housing 2 and includes a transmitting antenna 10. The first receiver 6 is secured within the housing 2 and includes a first receiving antenna 12 positioned at an axial distance $d_1$ from the transmitting antenna 10. The second receiver 8 is secured within the housing 2 and includes a second receiving antenna 14 positioned at an axial distance $d_2$ from the transmitting antenna 10, wherein $d_2$ is greater than $d_1$. A signal processor 16 is secured within the housing, receives input from the transmitter 4, first receiver 6 and second receiver 8 and determines the amplitude differences and phase differences between the transmitter and each of the receivers and between the two receivers.

Figure 2A:
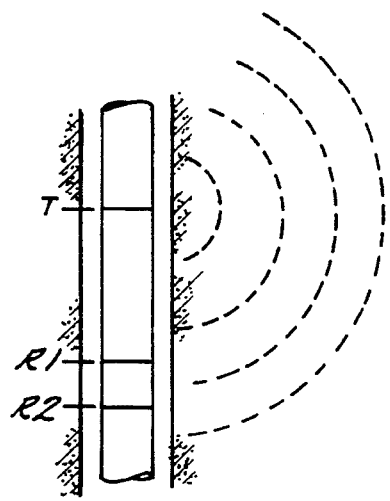
FIG. 2a shows a schematic view of a single transmitter measurement tool illustrating the wave propagation resistivity operating principle of the tool.
Figure 2B:
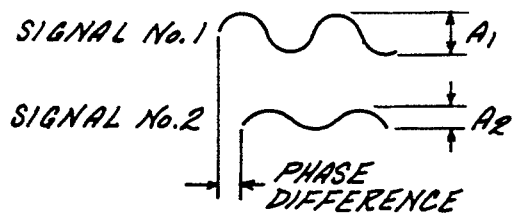

FIG. 2a shows the tool in operation. A wave is generated by the transmitter T, propagated into the surrounding rock formation and detected as it passes the two spaced receiving antennas, R1 and R2. The wave may be a.sonic wave or an electromagnetic wave. Preferably, the wave is an electromagnetic wave and has a frequency between 300 Hz and 20 MHz. Most preferably, the electromagnetic frequency has a wavelength between 1 MHz and 4 MHz. The wave sensed at each of the receivers R1 and R2 is shifted in phase and lower in amplitude than the wave at the transmitter T. The signal on the second receiver R2 is shifted in phase and lower in amplitude than the 30 signal on the first receiver R1. The phase shift and amplitude attenuation of the signal is shown in FIG. 2a.

In a conventional process using a single transmitter tool, the tool is positioned so that the measurement depth is between the two receivers and a single measurement is made at each measurement depth. The amplitude and phase differences between the receivers R1 and R2 and the transmitter T are measured. Resistivities are then derived from both the phase difference and the amplitude ratio between the receivers. The operation of this tool type is therefore similar to an acoustic velocity wireline tool with two spaced receivers in which the travel time replaces phase difference as the principal measured quantity. In each of the tools, measurement of a difference between the two receivers compensates for the effect of the borehole from the transmitter to the first receiver so that the measurement region is between the two receivers.

In the method of the present invention, the tool is placed in three different positions relative to the measurement depth. A measurement is made at each of the three positions and recorded. The measurements are used to calculate a borehole compensated phase difference and a borehole compensated attenuation.

Figure 3A:
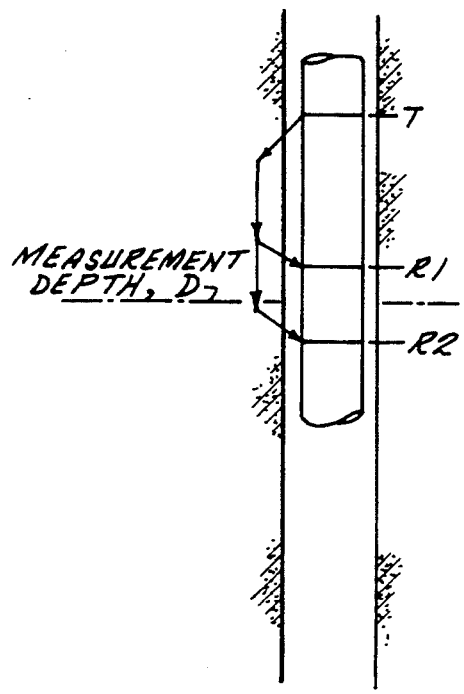
FIG. 3a shows a schematic view of a single transmitter formation measurement tool in a first position of the process of the present invention.

FIG. 3a shows a schematic view of a single transmitter formation measurement tool in a first position within the borehole, surrounded by the formation. The measurement depth D is between the first receiver R1 and second receiver R2. A waveform is propagated from the transmitter T through the surrounding formation. The wave is detected as it passes each of the two receivers. The first receiver senses a signal indicative of the phase shift, $P_{a1}$ of the wave between the transmitter and the first receiver, and the amplitude, $A_{a1}$ of the wave at first receiver. $P_{11}$ and $A_{a1}$ are recorded and stored. The second receiver senses a signal indicative of the phase shift, $P_{a2}$ of the wave between the transmitter and the second receiver and amplitude $A_{a2}$, of the wave at the second receiver. $P_{a2}$ and $A_{a2}$ are recorded and stored.

Figures 3B, 3C:
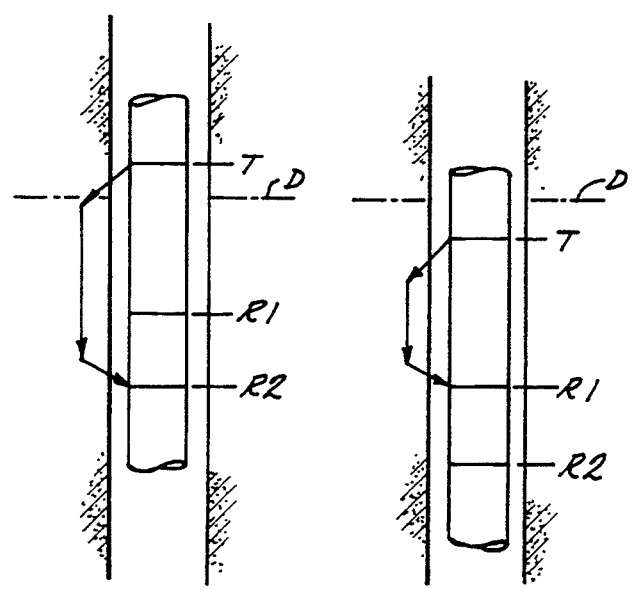
FIG. 3b shows a schematic view of a single transmitter formation measurement tool in a second position of the process of the present invention.
FIG. 3c shows a schematic view of a single transmitter formation measurement tool in a third position of the process of the present invention.

FIG. 3b shows a schematic view of a single transmitter formation measurement tool in a second position within the borehole. The transmitter T is axially displaced by the distance $d_1$ relative to the first position and the measurement depth D is between the transmitter T and the first receiver R1. A wave is propagated from the transmitter through the formation. The wave is detected as it passes each of the two receivers. R1 and R2. The first receiver R1 senses a signal indicative of the phase shift, $P_{b1}$ and the amplitude, $A_{b1}$ of the wave at the first receiver R1. $P_{b1}$ and $A_{b1}$ are recorded. The second receiver R2 senses a signal indicative of the phase shift, $P_{b2}$ of the wave between the transmitter T and the second receiver R2, and the amplitude, $A_{b2}$, of the wave at the second receiver R2. $P_{b2}$ and $A_{b2}$ are recorded and stored.

FIG. 3c shows a schematic view of a single transmitter formation measurement tool in a third position with the borehole. The transmitter T is axially displaced by the distance $d_2$ relative to the first position and the measurement depth D is above the transmitter. A wave is propagated from the transmitter T through the formation. The wave is detected as it passes each of the two receivers R1 and R2. The first receiver R1 senses a signal indicative of the phase shift, $P_{c1}$, of the wave between the transmitter T and the first receiver R1, and the amplitude $A_{c1}$ of the wave at the first receiver, R1. $P_{c1}$ and $A_{c1}$ are recorded and stored. The second receiver senses a signal indicative of the phase shift, $P_{c2}$, of the wave between the transmitter and the second receiver, and the amplitude, $A_{c2}$, of the wave at the second receiver. $P_{c2}$ and $A_{c2}$ are recorded and stored.

The method has been described as proceding with the tool descending the borehole. Clearly, the success of the method is not dependent upon the order in which the various steps are performed, i.e. the method may procede with the tool ascending the borehole as well as with the tool descending the borehole.

Using the stored measurements recorded at each of the three positions, a set of equations for borehole compensation may be evaluated. The borehole compensated phase shift (BCPS) may be calculated, where:

$$BCPS = ((P_{a2} - P_{a1}) + (P_{b2} - P_{c1}))/2;$$

where:

$P_{a1}$, $P_{a2}$, $P_{b2}$, and $P_{c1}$ are defined as above.

The borehole compensated attenuation of the two receivers (BCAT) may be calculated, where:

$$BCAT = 20 \log (A_{a2}/A_{a1})/2 + 20 \log (A_{b2}/A_{c1})/2$$

where:

$A_{a1}$, $A_{a2}$, $A_{b2}$ and $A_{c1}$ are defined as above.

The single transmitter borehole compensation method of the present invention significantly reduces measurement errors caused by hole rugosity and hole washouts. The method improves the accuracy of the single transmitter tool, and provides symmetric material response.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for borehole compensation at a measurement depth in a formation surrounding a borehole using a single transmitter measurement tool, said tool including a housing, a transmitter for generating a wave form, said transmitter secured within the housing, a first receiver, responsive to the wave form, secured within the housing at an axial distance, $d_1$, from the transmitter, and a second receiver, responsive to the wave form, secured within the housing at an axial distance, $d_2$ from the transmitter wherein $d_2 > d_1$, comprising:

(a) placing the tool in a first position within the borehole so that the measurement depth is between the first and second receivers, and propagating a first wave from the transmitter through the formation, sensing a signal indicative of the phase shift $P_{a1}$, of the first wave between the transmitter and the first receiver and the amplitude, $A_{a1}$, of the first wave at the first receiver, recording $P_{a1}$ and $A_{a1}$, sensing a signal indicative of the phase shift, $P_{a2}$, of the first wave between the transmitter and the second receiver, and the amplitude, $A_{a2}$, of the first wave at the second receiver, and recording $P_{a2}$ and $A_{a2}$;

(b) placing the tool in a second position within the borehole so that the tool is axially displaced by the distance $d_1$ relative to the first position and the measurement depth is between the transmitter and the first receiver, and propagating a second wave from the transmitter through the formation, sensing a signal indicative of the phase shift, $P_{b2}$, of the second wave between the transmitter and the second receiver, and of the amplitude, $A_{b2}$ of the second wave at the second receiver, recording $P_{b2}$ and $Ab_2$;

(c) placing the tool in a third position within the borehole so that the tool is axially displaced by the distance $d_2$ relative to the first position and the measurement depth is above the transmitter, and propagating a third wave from the transmitter through the formation, sensing a signal indicative of the phase shift, $P_{c1}$, of the third wave between the transmitter and the first receiver, and of the amplitude, $A_{c1}$, of the third wave at the first receiver, recording $P_{c1}$ and $A_{c1}$; calculating a borehole compensated phase shift, BCPS, where:

$$BCPS = ((P_{a2} - P_{a1}) + (P_{b2} - P_{c1}))/2;$$

and calculating a borehole compensated attenuation, BCAT, where:

$$BCAT = 20 \log (A_{a2}/A_{a1})/2 + 20 \log (A_{b2}/A_{c1})/2.$$

2. The method of claim 1, wherein the wave is an electromagnetic wave.

3. The method of claim 2, wherein the electromagnetic wave has a frequency between 1 MHz and 4 MHz.

4. The method of claim 1, wherein the wave is a sonic wave.

5. The method of claim 1, wherein the method proceeds from step (a) to step (b) to step (c) as the tool descends the borehole.

6. The method of claim 1, wherein the method proceeds from step (c) to step (b) to step (a) as the tool ascends the borehole.

7. A method for borehole compensation at a measurement depth in an earth formation surrounding a borehole using a transmitter and receiver tool, said tool including a housing, a transmitter for generating a wave form, said transmitter being secured to the housing, a first receiver responsive to the wave form and secured to the housing at an axial distance $d_1$ from the transmitter, and a second receiver responsive to the wave form, and secured to the housing at an axial distance $d_2$ from the transmitter where $d_2 > d_1$, comprising:

a) placing the tool in a first position within the borehole so that said measurement depth is between the first and second receivers, propagating a first wave from the transmitter into the formation, sensing a signal indicative of a phase shift, $p_{a1}$ of the first wave between the transmitter and the first receiver, and sensing a signal indicative of a phase shift, $P_{a2}$, of the first wave between the transmitter and the second receiver;

b) placing the tool in a second position within the borehole so that the tool is axially displaced by the distance $d_1$ relative to the first position, propagating a second wave from the transmitter into the formation, and sensing a signal indicative of ta phase shift $P_{b2}$ of the second wave between the transmitter and the second receiver;

c) placing the tool in a third position within the borehole, said third position being axially displaced by the distance $d_2$ relative to the first position, propagating a third wave from the transmitter into the formation, and sensing a signal indicative of the phase shaft $P_{c1}$ of the third wave between the transmitter and the first receiver; and d) calculating a borehole compensated phase shift, BCPS, wherein:

$$BCPS = ((P_{a2} - P_{a1}) + (P_{b2} - P_{c1}))/2.$$

8. The method of claim 7, wherein the wave is an electromagnetic wave.

9. The method of claim 7, wherein the electromagnetic wave has a wavelength between 1 MHz and 4 MHz.

10. The method of claim 7, wherein the wave is a sonic wave.

11. The method of claim 7, wherein the method proceeds from step (a) to step (b) to step (c) as the tool descends the borehole.

12. The method of claim 7, wherein the method proceeds from step (a) to step (b) to step (c) as the tool ascends the borehole.

13. A method for borehole compensation at a measurement depth in an earth formation surrounding a borehole using a transmitter and receiver tool, said tool including an axially extending housing, a transmitter for generating a wave form, said transmitter being secured to the housing, a first receiver responsive to the wave form and secured to the housing at an axial distance $d_1$ from the transmitter, and a second receiver responsive to the wave form and secured to the housing at an axial distance $d_2$ from the transmitter, wherein $d_2 > d_1$, comprising:

a) placing the tool in a first position within the borehole so that said measurement depth is between the first and second receivers, sensing a signal indicative of the amplitude $A_{a1}$ of the first wave at the first receiver, sensing a signal indicative of the amplitude $A_{a2}$ of the first wave at the second receiver;

b) placing the tool in a second position within the borehole so that the tool is axially displaced by the distance $d_1$ relative to the first position, propagating a second wave from the transmitter into the formation, sensing a signal indicative of the amplitude $A_{b2}$ of the second wave at the second receiver;

c) placing the tool in a third position within the borehole so that the tool is axially displaced by the distance $d_2$ relative to the first position, propagating a third wave from the transmitter through the formation, and sensing a signal indicative of the amplitude, $A_{c1}$ of the third wave at the first receiver; and d) calculating a borehole compensated attenuation, BCAT, wherein:

$$BCAT = 20 \log(A_{a2}/A_{a1})/2 + 20 \log (A_{b2}/A_{c1})/2.$$

14. The method of claim 13, wherein the wave is an electromagnetic wave.

15. The method of claim 13, wherein the electromagnetic wave has a frequency between 1 MHZ and 4 MHz.

16. The method of claim 13, wherein the wave is a sonic wave.

17. The method of claim 13, wherein the method proceeds from step (a) to step (b) to step (c) as the tool descends the borehole.

18. The method of claim 13, wherein the method proceeds from step (c) to step (b) to step (a) as the tool ascends the borehole.

19. The method of claim 8 wherein:

in step (b) said measurement depth is between the transmitter and the first receiver; and in step (c) said measurement depth is above the transmitter.

20. The method of claim 13 wherein:

in step (b) said measurement depth is between the transmitter and the first receiver; and in step (c) said measurement depth is above the transmitter.

21. A method for borehole compensation at a measurement depth in a formation surrounding a borehole using a transmitter and receiver measurement tool, said tool including a housing, a transmitter for generating a wave form, said transmitter being secured to the housing, a first receiver responsive to the wave form and secured to the housing at an axial distance $d_1$ from the transmitter, and a second receiver responsive to the wave form and secured to the housing at an axial distance $d_2$ from the transmitter, wherein $d_2$ is greater than $d_1$, comprising:

(a) placing the tool in a first position within the borehole so that the measurement depth is between the first and second receivers, and propagating a first wave from the transmitter through the formation, sensing a signal indicative of the phase shift $p_{a1}$ of the first wave between the transmitter and the first receiver and the amplitude $A_{a1}$ of the first wave at the first receiver, recording $P_{a1}$ and $A_{a1}$, sensing a signal indicative of the phase shift, $P_{a2}$ of the first wave between the transmitter and the second receiver, and the amplitude $A_{a2}$ of the first wave at the second receiver, and recording $P_{a2}$ and $A_{a2}$;

(b) placing the tool in a second position within the borehole so that the tool is axially displaced by the distance $d_1$ relative to the first position, and propagating a second wave from the transmitter through the formation, sensing a signal indicative of the phase shift $P_{b2}$ of the second wave between the transmitter and the second receiver, and of the amplitude $A_{b2}$ of the second wave at the second receiver, recording $P_{b2}$ and $A_{b2}$;

(c) placing the tool in a third position within the borehole so that the tool is axially displaced by the distance $d_2$ relative to the first position, and propagating a third wave from the transmitter through the formation, sensing a signal indicative of the phase shift, $P_{c1}$, of the third wave between the transmitter and the first receiver, and of the amplitude $A_{c1}$, of the third wave at the first receiver, recording $P_{c1}$ and $A_{c1}$;

calculating a borehole compensated phase shift, BCPS, where:

$$BCPS = ((P_{a2} - P_{a1}) + (P_{b2} - P_{c1}))/2;$$

and calculating a borehole compensated attenuation, BCAT, where:

$$BCAT = 20 \log (A_{a2}/A_{a1})/2 + 20 \log (A_{b2}/A_{c1})/2.$$

* * * * *

UNITED STATES PATENT AND TRADEMARK OFFICE
CERTIFICATE OF CORRECTION

PATENT NO.    : 5,361,239
DATED         : November 1, 1994
INVENTOR(S)   : William A. Zoeller It is certified that error appears in the above-identified patent and that said Letters Patent is hereby corrected as shown below:

Column 3,
Line 1, delete "wavelength" and insert therefor -- wave --
Line 6, after "the" (first occurrence) delete "30"
Line 41, delete "$P_{11}$" and insert therefor -- $P_{al}$ --
Line 66, after "depth" delete "D"

Column 6,
Line 9, delete "ta" and insert therefor -- a --
Line 17, delete "shaft" and insert therefor -- shift --
Line 36, delete "(a) to step (b) to step (c)" and insert -- (c) to step (b) to step (a) --

Signed and Sealed this

Fourteenth Day of May, 2002

*Attest:*

JAMES E. ROGAN
*Attesting Officer*   *Director of the United States Patent and Trademark Office*